United States Patent
Godwin

[11] 3,861,281
[45] Jan. 21, 1975

[54] ADJUSTABLE GRILLE
[75] Inventor: Hartsel L. Godwin, Arlington, Tex.
[73] Assignee: Volkswagen Products Corporation, Fort Worth, Tex.
[22] Filed: Jan. 22, 1973
[21] Appl. No.: 325,574

[52] U.S. Cl............... 98/2, 98/40 VM, 98/110, 98/121 A
[51] Int. Cl............................................. B60h 1/24
[58] Field of Search ............ 98/2, 2.05, 2.08, 2.09, 98/2.11, 121 R, 121 A, 40 V, 40 VM, 110; 180/90; 280/150 B; 251/299, 297, 287; 248/293, 47.53; 312/328, 229, 242

[56] References Cited
UNITED STATES PATENTS

| | | | |
|---|---|---|---|
| 2,582,884 | 1/1954 | Nicol | 312/328 |
| 2,907,602 | 10/1959 | Lagerling | 280/150 B |
| 2,987,981 | 6/1961 | Boylan | 98/110 |
| 3,119,279 | 1/1964 | Reece | 74/531 |
| 3,378,199 | 4/1968 | Snell | 98/40 C |
| 3,530,782 | 9/1970 | Ardussi | 98/121 R |
| 3,572,233 | 3/1971 | Bar et al. | 98/40 VM |
| 3,598,197 | 8/1971 | Neece | 98/2.11 |
| 3,662,668 | 5/1972 | Johnson | 98/121 A |
| 3,680,470 | 8/1972 | Neece | 98/121 A |
| 3,763,760 | 10/1973 | Erickson | 98/2.16 |

*Primary Examiner*—Charles J. Myhre
*Assistant Examiner*—Paul Devinsky
*Attorney, Agent, or Firm*—Darby & Darby

[57] ABSTRACT

A grille assembly adjustably mounted within the dashboard of a vehicle for distributing and directing either ventilation or conditioned air within the passenger compartment including a main frame enclosing a vane assembly. The grille assembly is adapted for use within a dashboard which slopes downwardly and away from the passenger compartment and is mounted within a housing which is itself fixed within the dashboard. During great deceleration of the vehicle accompanying an emergency situation, the grille assembly, which normally projects into the path of an occupant who might continue to move forwardly due to inertia, is adapted to withdraw into the housing out of this path upon initial impact with the occupant, thereby removing the grille as a potential safety hazard.

3 Claims, 4 Drawing Figures

ADJUSTABLE GRILLE

BACKGROUND OF THE INVENTION

This invention relates generally to adjustable grilles for fluid distribution, and more particularly to adjustable air conditioning or ventilation grilles for discharging air in selected directions within the passenger compartments of a vehicle such as an automobile.

In directing air into the passenger compartment of an automobile, various prior grilles have been designed where the comfort of the occupants of the vehicle served as the primary design criteria, with the only possible secondary consideration being the esthetic qualities of the grille-equipped dashboard. In the past few years, however, passenger safety has become at least equally as important as comfort and appearance.

In certain types of vehicles, adjustable fluid distribution grilles have been provided with a view towards passenger comfort and pleasing appearance. However, these grilles have also resulted in the creation of hazardous conditions within the passenger compartment. More particularly, certain vehicles have dashboards and instrument panels which extend downwardly and away from the occupant of the passenger compartment. Such design is often necessitated by space requirements and is common in the various compact and sub-compact cars commonly seen. In order to direct air from a fluid distribution grille which is mounted on such a "receding" dashboard towards the upper part of the passenger compartment (a direction which is desirable due to the characteristic of cool air descending to the lower parts of its enclosure), the grilles in the past have been mounted so that portions project beyond the plane of the dashboard. Often, these projecting grilles form sharp angles with the dashboard surface. Although such configurations have succeeded in directing air into the upper portions of the passenger compartment, thereby satisfying the comfort requirements and are oftentimes esthetically pleasing, the projecting housings present a hazard to the occupants of the automobile. For example, during a head-on collision situation, the head of an occupant moving under inertial forces may impact against an unyielding grille which juts out from the dashboard thereby causing injury to the occupant.

SUMMARY OF THE INVENTION

Accordingly, an object of this invention is to provide a new and improved adjustable grille for directing ventilation or cooled air into the passenger compartment of a vehicle.

Another object of the invention is the provision of a new and improved fluid distribution grille adapted to be mounted on a receding dashboard for directing air in any desired direction.

Still another object of the present invention is to provide a new and improved adjustable grille which is completely safe and which does not present a hazard to the occupants of the passenger compartment of a vehicle during emergency deceleration situations.

In accordance with a preferred embodiment of this invention, these and other objects are achieved by providing, in a vehicle having a dashboard which inclines downwardly and away from the occupants of the passenger compartment, a grille assembly including a housing fixed within the dashboard and a grille adjustably mounted within the housing. The grille includes a main frame enclosing an adjustable vane assembly. After adjustment, should the position of the grille be such that it is in the path of an occupant of the vehicle thrown during emergency deceleration, the grille is adapted to retract within the housing immediately upon impact. This yielding of the grille assures that an occupant who is thrown against it will not be seriously injured.

DESCRIPTION OF THE DRAWINGS

A more complete appreciation of the invention and many of the attendant advantages thereof will be readily attained by reference to the following detailed description taken in conjunction with the accompanying drawings in which.

DESCRIPTION OF THE PREFERRED EMBODIMENT

Figure 1:
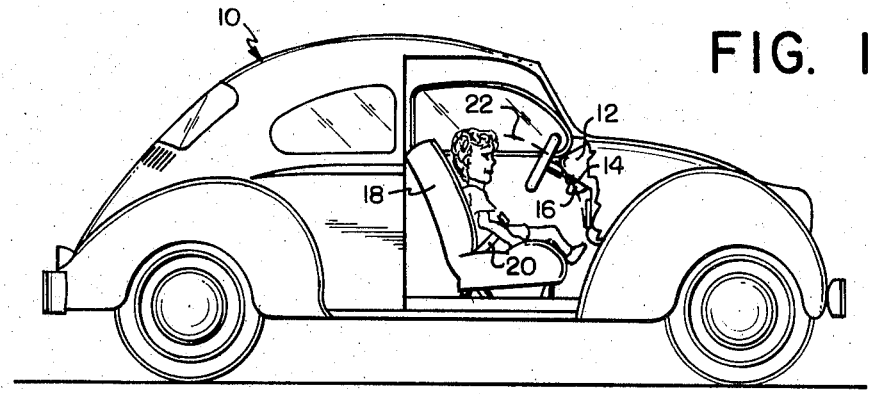
FIG. 1 is a side view of a vehicle in which the present invention is installed, partially broken away, illustrating the path of movement of an occupant during emergency deceleration of the vehicle.

Referring now to the drawings, wherein like reference characters indicate identical or corresponding parts throughout the several views, and more particularly to FIG. 1 thereof, a vehicle 10 is illustrated in which the adjustable grille assembly of the present invention is intalled. Although a Vokswagen has been used to illustrate the positioning and functioning of the invention, it is understood that other types and models of vehicles may be provided with the grille assembly comprising the present invention. In particular, however, the invention is most useful in vehicles have dashboards which are "receding" or, in other words, sloped downwardly and away from the occupants of the passenger compartment. Vehicle 10 includes a dashboard 12 defined by a receding surface 14 which enables additional space to be available for the comfort of the occupants of the vehicle.

An appropriate number of air distribution grille assemblies or louvers 16 may be provided along the length of dashboard 12 to assure even cooling or ventilation within the vehicle in a horizontal direction perpendicular to the plane of FIG. 1. It is desirable for each louver to be oriented in an upward direction in order to distribute incoming air (either ventilation or conditioned) to the upper parts of the passenger compartment. Such direction facilitates the circulation of the air within the passenger compartment in addition to cooling the upper parts of the occupants of the front seat of the vehicle. An additional reason for directing the air upwardly exists when the louvers are used to distribute conditioned or cooled air, namely, since cool air is heavier than air at normal temperatures, should air be initially directed downwardly or even horizontally it would tend to move downwardly without affecting the temperature within the upper portions of the passenger compartment. Thus, it is necessary to orient the grille in a manner to distribute the air towards the upper parts of the passenger compartment.

As seen in FIG. 1, when an air distribution grille is provided on receding dashboard 12, the head of a child or other occupant of the front seat of the vehicle 10, even when properly restrained in seat 18 by a seat belt 20, might still travel along a path defined by dotted line 22 during an automobile collision or other emergency deceleration so as to impact against the projecting grille 16. Most prior grille assemblies have been mounted on receding dashboards as shown in FIG. 1, projecting so that air may be directed upwardly for reasons explained above. However, the grille assembly of the present invention is adapted to pivot upon relatively slight impact out of the path 22 and to withdraw within the dashboard 12 during such an emergency situation.

Figure 2:
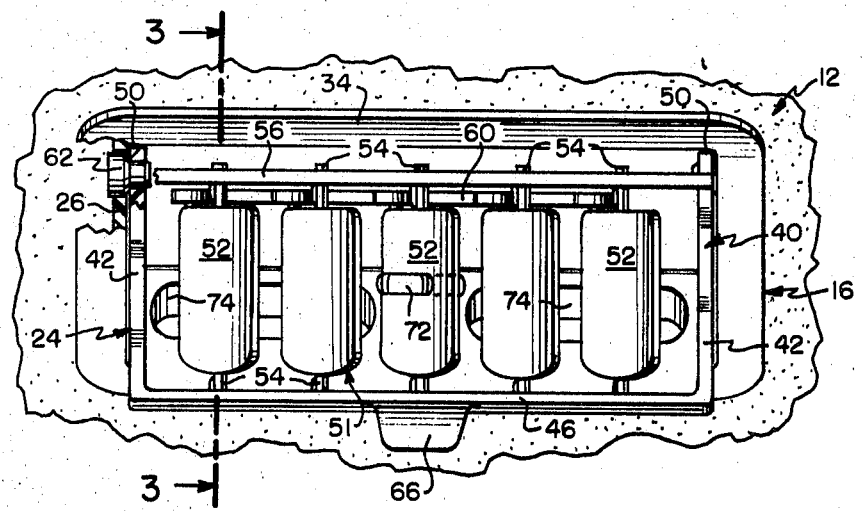
FIG. 2 is a front view in partial section of the adjustable grille assembly of the present invention.
Figure 3:
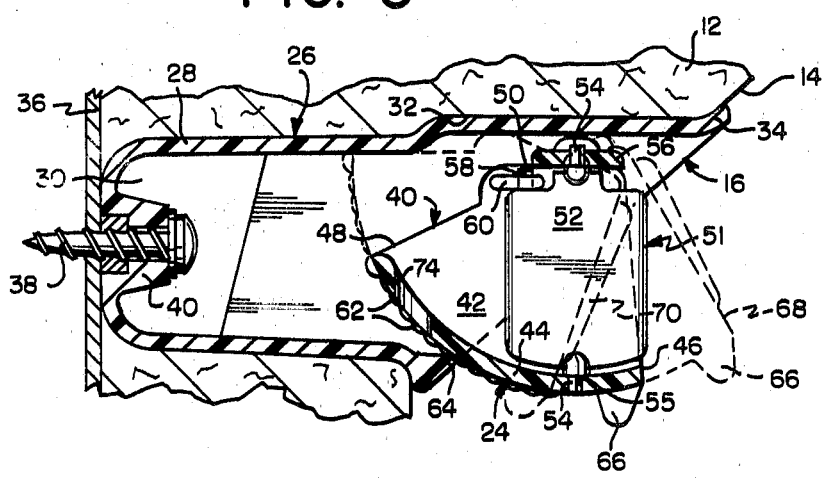
FIG. 3 is a side view in section taken along line 3—3 of FIG. 2, illustrating various operating positions of the invention.
Figure 4:
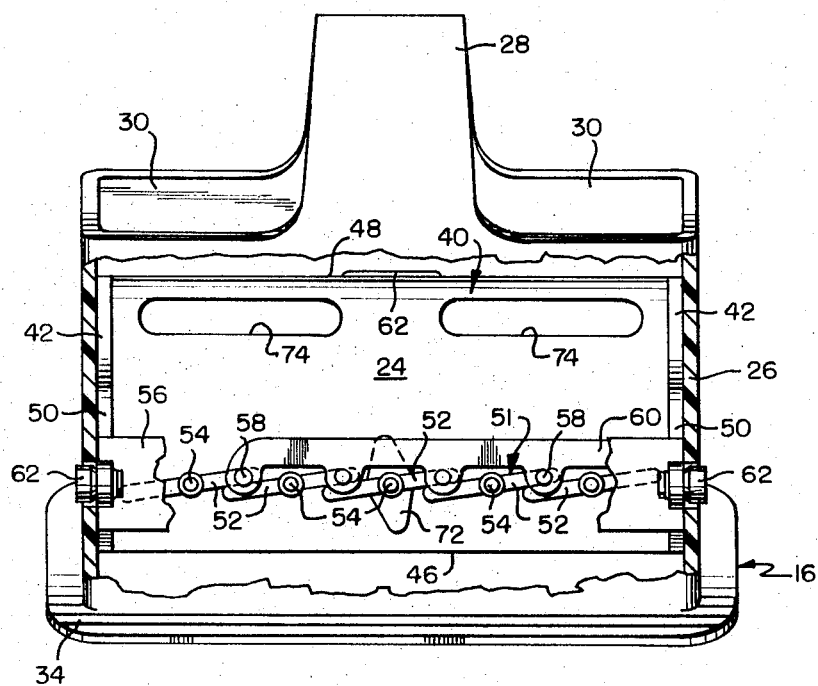
FIG. 4 is a plan view in partial section of the present invention.

Refering now to FIGS. 2 and 3, the grille assembly generally denoted at 16 includes a main frame 24 pivotally mounted within a housing 26. The housing 26 may be constructed of a suitable plastic material in the form of an air duct having a substantially rectangular cross-section as best seen in FIG. 2. The rearward end of housing 26 has a bridging 28 which extends from the upper to the lower housing wall as seen in FIG. 4, thereby forming a pair of fluid inlet openings 30 which cooperate with the ends of air ducts (not shown) originating at vents or air conditioning equipment.

Dashboard 12 is formed with a cavity 32 (FIG. 3) having a cross section which conforms to the cross section of the housing so as to snugly receive the housing. Still referring to FIG. 3, the mouth of housing 26 has a receding profile to conform to the receding dashboard surface 14. Outwardly turned lips 34 engage flush against the surface 14 immediately surrounding cavity 32. Upon inserting housing 26 within cavity 32, the end of the bridging element 28 abuts a rigid surface 36 which may be the fire wall separating the forward compartment of the vehicle 10 from the passenger compartment as shown in FIG. 3, or may merely be the rear surface of cavity 32. Finally, the housing is fastened in place by a screw 38 provided within an inwardly formed boss 40 on bridging element 28.

The main frame 24 of grille assembly 16 comprises a main U-shaped member 40 formed by planar side sections 42 integrally joined along their lower edges with an arcuate connecting bottom wall 44. Each side section 42 is defined by an arcuate lower edge (FIG. 3) where it merges with the bottom wall 44 and leading and trailing edges 46 and 48, respectively, which edges taper towards each other in an upward direction and merge in a straight upper edge 50.

A vane assembly 51 is provided within the main frame to direct the air in any desired side direction. The vane assembly includes a plurality of vanes 52, each vane being pivotally mounted within the main frame about a pair of coaxial stub shafts 54 integral with each vane. During assembly, each lower stub shaft 54 is positioned within an opening 55 (FIG. 3) formed in the bottom wall 44. Immediately following this step, an elongate retaining bar 56 is placed over the main U-shaped element 40 so that its ends rest upon the upper edges 50 of each planar side section 42. A series of openings are formed through the retaining bar 56 receivable of the upper stub shaft 54 of each vane 52. Thus, upon positioning retaining member 56, each vane is individually pivotally mounted about its own axis. The vanes are adapted to rotate as a unit by providing a third stub shaft 58 at the rear of the upper edge of each vane 52.

A connecting link 60, having equally spaced bores formed in protrusions as best seen in FIG. 4, is fitted over the plurality of vanes so that each third shaft 58 is received within a bore. When one vane is rotated, the connecting link 60 causes the others to pivot in a similar manner.

The main frame 24 including the vane assembly 51, comprising the grille, is pivotally mounted at the mouth of housing 26. A pair of coaxial shafts 62 are provided on an upper position of the side walls of the housing 26, each shaft 62 being mounted at about the midpoint of the upper side wall section which extends over the lower lip 34. Each shaft includes a larger diameter portion fixed within the housing wall and a reduced diameter portion which extends within the interior of the housing and which functions as the pivot point for respective side sections 42 of the main frame. To receive this reduced shaft portion, the side sections 42 have protuberances formed on their upper edges 50, each protuberance having a bore formed therethrough to receive the shaft.

The underside of the arcuate bottom wall 44 is formed with a series of protrusions 62 (FIG. 3) which define a corresponding set of indentations. These protrusions are of sufficient size to bear against a detent 64 integrally formed on the lower edge of housing 26. A tab 66 is formed on bottom wall 44 adjacent leading edge 46 to provide a graspable handle for adjusting the position of the grille as will be seen below.

The placement of shafts 62 is important and can be best seen by referring to FIG. 3. By pivotally mounting the main frame to the upper extremity of that portion of side sections 42 which extend beyond lower lip 34, the main frame is rendered adjustable between the position shown in phantom lines denoted by 68 that position denoted by 70. Position 68 represents the normal operating position whereby the main frame directs the outgoing air in an upward direction. Of course, should it be desired to direct the air in another direction, the main frame, may be rotated to another position. For example, should it be desired to direct air horizontally or downwardly, the main frame may be positioned as shown in solid lines or as noted by position 68, respectively. In order to assure that the grille will rotate a sufficient amount to be able to direct the air either upwardly or downwardly, the bottom wall 40 in the present embodiment extends about 60 degrees. Of course, this angle may be varied within the scope of the invention. Of course, this angle may be varied within the scope of the invention. In each position, the grille is retained in place by the cooperation of the indentations formed between protrusions 62 and detent 64. However, during usual operation, the main frame will be in position 68.

As may be seen in FIG. 3, position 68 also represents the position which presents the greatest danger to an occupant of the passenger compartment of the vehicle since the main frame projects far enough from the dashboard so as to be in path 22 of an occupant who might be thrown during emergency deceleration situation of the vehicle. By virtue of the construction described above, should a passenger be thrown forward and impact against the main frame which is in position 68, the impact would instantly rotate the main frame to a position shown at 70 and out of the path. This yielding of position assures that the force of the grille against the passenger will be relatively minor.

Further, in order to minimize the possibility of injury, a handle 72 which is provided on the central vane 52 for rotating the vane assembly is sufficiently short so that under all circumstances, including when the vanes are in a closed configuration as shown in FIG. 4, the handle will not extend beyond the leading edge of the main frame side sections. This assures that no projections will extend from the main frame on which a passenger might impale himself during a fast stop.

As an additional comfort feature, the arcuate bottom wall 44 may have slots 74 formed through it adjacent to its rearward edge. When the grille is fully extended from the housing as shown at 68 in FIG. 3, these slots serve as air distribution openings and direct the exiting air towards the lower portions of the passenger compartment. Thus, the cooled or ventilation air may be directed upwardly and downwardly simultaneously. Additionally, as the grille is adjusted to direct the exiting air in less of an upward direction as, for example, by moving it from position 68 to the position shown in solid lines in FIG. 3, the slots 74 move within housing 26 and no longer serve to distribute the air exiting from the grille assembly.

Of course, embodiments containing various modifications and variations from the one specifically described above are possible in the light of the above teachings. For example, grilles having vane assemblies rotatable through conventional structure other than that shown are intended to be contained within the scope of the present teachings. It is therefore to be understood that within the scope of the appended claims the invention may be practiced otherwise than as specifically described herein.

What is claimed is:

1. An adjustable grille assembly comprising:
    a housing having an upper, a lower, and side walls, the forward end of the upper wall extending beyond the forward end of the lower wall, thereby defining a housing mouth which recedes in a downward direction;
    a grille frame defining a fluid flow passage pivotally mounted within the mouth of said housing about a horizontal axis, said axis passing through an upper portion of said frame and an upper portion of said housing, said grille frame including a convex bottom wall in substantially continuous sliding contact with the forward end of the lower housing wall, a pair of side walls, a top wall, and a plurality of vanes, each vane being pivotally mounted between the top and bottom frame walls, said convex bottom wall having a leading edge and a trailing edge and slot means formed therethrough adjacent said trailing edge for diffusing the fluid passing into said grille frame in a downward direction when the grille frame is directing the bulk of the fluid through said vanes in an upward direction; and
    detent means formed on the lower surface of said convex bottom wall adapted to cooperate with said forward end of the housing lower wall to selectively fix said grille frame in a particular position;
    wherein the grille frame is adapted to be retractable from a first position in which the frame extends substantially outside of said housing to a second position in which the frame is substantially within the housing.

2. An adjustable grille assembly comprising:
    a housing having an upper, a lower, and side walls, the forward end of the upper wall extending beyond the forward end of the lower wall thereby defining a housing mouth which recedes in a downward direction;
    a grille frame defining a fluid flow passage pivotally mounted within the mouth of said housing about a horizontal axis, said axis passing through an upper portion of said frame and an upper portion of said housing, said grille frame including a convex bottom wall in substantially continuous sliding contact with the forward end of the lower housing wall, pair of side walls, a top wall, and a plurality of vanes, each vane being pivotally mounted between the top and bottom frame walls, wherein the length of the arc described by said convex bottom frame wall is at least as long as the distance between a first point and a second point located in the same vertical plane, said first point being on the upper housing wall located rearwardly of said axis a distance equal to the radius of curvature of the bottom frame wall and said second point being on the forward end of the lower housing wall, so that when said grille frame is moved to said second position, the trailing edge of said convex bottom wall abuts against the upper housing wall and said bottom convex frame wall therefore extends substantially between the upper, lower and side walls of said housing; and
    detent means formed on the lower surface of said convex bottom wall adapted to cooperate with said forward end of the housing lower wall to selectively fix said grille frame in a particular position;
    wherein the grille frame is adapted to be retractable from a first position in which the frame extends substantially outside of said housing to a second position in which the frame is substantially within the housing.

3. An adjustable grille assembly as recited in claim 2 further including aperture means formed in said convex bottom wall of said grille frame for permitting fluid flow through said convex bottom wall and out of said grille frame when said grille frame is in said second position.

* * * * *